(12) United States Patent
Chen et al.

(10) Patent No.: US 11,823,554 B2
(45) Date of Patent: Nov. 21, 2023

(54) METHODS FOR EMBEDDING PROTECTED VEHICLE IDENTIFIER INFORMATION IN CELLULAR VEHICLE-TO-EVERYTHING (C-V2X) MESSAGES

(71) Applicant: QUALCOMM Incorporated, San Diego, CA (US)

(72) Inventors: Shuping Chen, Beijing (CN); Rulin Xing, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/756,968

(22) PCT Filed: Jan. 21, 2020

(86) PCT No.: PCT/CN2020/073420
§ 371 (c)(1),
(2) Date: Jun. 7, 2022

(87) PCT Pub. No.: WO2021/146891
PCT Pub. Date: Jul. 29, 2021

(65) Prior Publication Data
US 2023/0019827 A1      Jan. 19, 2023

(51) Int. Cl.
G08B 25/00        (2006.01)
H04W 4/44        (2018.01)
G08B 25/10        (2006.01)

(52) U.S. Cl.
CPC .......... *G08B 25/009* (2013.01); *G08B 25/10* (2013.01); *H04W 4/44* (2018.02)

(58) Field of Classification Search
CPC ..... G08B 25/009; H04W 4/44; G08G 1/0112; G08G 1/017
See application file for complete search history.

(56) References Cited

U.S. PATENT DOCUMENTS 9,048,960 B2      6/2015  Li et al.
2019/0005445 A1  1/2019  Bahrainwala et al.
(Continued)

FOREIGN PATENT DOCUMENTS

CN   108238002   *   1/2018   ............. G08G 1/205
CN   107683613 A       2/2018
(Continued)

OTHER PUBLICATIONS

International Searching Authority; International Application No. PCT/CN2020/073420; International Search Report and Written Opinion; dated Oct. 23, 2020; 8 pages.
(Continued)

*Primary Examiner* — Hongmin Fan
(74) *Attorney, Agent, or Firm* — The Marbury Law Group, PLLC

(57) ABSTRACT

Various embodiments include methods that may be performed in a computing device of a vehicle for communicating permanent vehicle identification information in vehicle communications in response to detecting that there is a need to send the vehicle permanent identification information to a concerned party. The computing device may generate a message including the vehicle permanent identification information, and transmit the generated message to a roadside unit for routing to the concerned party. In some embodiments, the permanent vehicle identification information may be included in cellular vehicle-to-everything (C-V2X) protocol messages.

24 Claims, 10 Drawing Sheets

(56) References Cited

U.S. PATENT DOCUMENTS

| | | |
|---|---|---|
| 2019/0096215 A1 | 3/2019 | Shahid et al. |
| 2019/0283709 A1* | 9/2019 | Lu et al. |
| 2020/0003861 A1* | 1/2020 | Eriksson ................. B60R 21/01 |
| 2021/0076180 A1* | 3/2021 | Parker ..................... H04W 4/44 |
| 2023/0036475 A1* | 2/2023 | Yu .................... G08G 1/096861 |

FOREIGN PATENT DOCUMENTS

| | | | |
|---|---|---|---|
| CN | 110047239 | * | 4/2019 |
| CN | 110047239 A | | 7/2019 |
| CN | 110149611 A | | 8/2019 |
| CN | 209710082 U | | 11/2019 |
| EP | 1684250 A2 | | 7/2006 |
| WO | WO 2012124877 | * 9/2012 | ............. G08G 1/205 |
| WO | 2014028721 | | 2/2014 |
| WO | 2016163791 A1 | | 10/2016 |

OTHER PUBLICATIONS

Supplementary European Search Report—EP20914839—Search Authority—The Hague—dated Aug. 9, 2023.

* cited by examiner

```
BasicSafetyMessage ::= SEQUENCE {
        msgCnt MsgCount,
        id OCTET STRING (SIZE(8)),
        -- temperary vehicle ID
        secMark DSecond,
        timeConfidence TimeConfidence OPTIONAL,
        pos Position3D,
        posAccuracy PositionalAccuracy OPTIONAL,
        -- Accuracy for GNSS system
        posConfidence PositionConfidenceSet OPTIONAL,
        -- Realtime position confidence
        transmission TransmissionState,
        speed Speed,
        heading Heading,
        angle SteeringWheelAngle OPTIONAL,
        motionCfd MotionConfidenceSet OPTIONAL,
        accelSet AccelerationSet4Way,
        brakes BrakeSystemStatus,
        size VehicleSize,
        vehicleClass VehicleClassification,
        -- VehicleClassification includes BasicVehicleClass and other extendible type
        safetyExt VehicleSafetyExtensions OPTIONAL,
        emergencyExt VehicleEmergencyExtensions OPTIONAL,
        permanentIDinformationExt PermanentIDInformationExtensions OPTIONAL, }
PermanentIDInformationExtensions :: = SEQUENCE {
                                permanentIDdigest OCTET STRING (SIZE
                                (4..16))
                -- the encrypted permanent vehicle ID digest

```
PermanentIDInformationMessage ::= SEQUENCE {
    msgCnt MsgCount,
    IDdigest OCTET STRING (SIZE (4...16))
    -- the encrypted permanent vehicle ID digest
    secMark DSecond,
    timeConfidence TimeConfidence OPTIONAL,
    pos Position3D,
    posAccuracy PositionalAccuracy OPTIONAL,
    -- Accuracy for GNSS system
    posConfidence PositionConfidenceSet OPTIONAL,
    -- Realtime position confidence
    transmission TransmissionState OPTIONAL,
    speed Speed,
    heading Heading,
    angle SteeringWheelAngle OPTIONAL,
    motionCfd MotionConfidenceSet OPTIONAL,
    accelSet AccelerationSet4Way OPTIONAL,
    brakes BrakeSystemStatus OPTIONAL,
    size VehicleSize OPTIONAL,
    vehicleClass VehicleClassification OPTIONAL,
    -- VehicleClassification includes BasicVehicleClass
    and other extendible type
    safetyExt VehicleSafetyExtensions OPTIONAL,
    ...
}
```

FIG. 7

METHODS FOR EMBEDDING PROTECTED VEHICLE IDENTIFIER INFORMATION IN CELLULAR VEHICLE-TO-EVERYTHING (C-V2X) MESSAGES

BACKGROUND

Cellular and wireless communication technologies have seen explosive growth over the past several years and are being used to support communications between a host of different types of communication devices, such as smartphones, vehicle-based communication devices, infrastructure communication devices, network communication devices, etc. This growth has been fueled by better communications hardware, larger networks, and more reliable protocols.

The surface transportation industry has increasingly looked to leverage the growing capabilities of cellular and wireless communication technologies through the adoption of Intelligent Transportation Systems (ITS) technologies to increase intercommunication and Safety for both driver-operated vehicles and autonomous vehicles. The vehicle-to-everything (V2X), particularly the cellular vehicle-to-everything (C-V2X) protocol defined by the 3rd Generation Partnership Project (3GPP), support ITS technologies and serves as the foundation for vehicles to communicate directly with the communication devices around them.

C-V2X communication technologies hold promise for improving vehicle safety, managing traffic congestion and support autonomous and semi-autonomous vehicles. In V2X system, the most important information broadcasted/exchanged between vehicles, and between vehicles and road side units (RSUs) are basic safety messages. However, there are many other types of messages being defined. For example, SAE J2735 has defined 16 messages, including basic safety messages (BSM), roadway safety announcements (RSA), map data (MAP), Signal Phase and Timing (SPaT) messages, etc. China has defined BSM, Road Sign Information (RSI) messages, MAP, SPaT and Road Safety Messages (RSM) for phase 1 C-V2X deployment.

In C-V2X applications, there is a potential requirement that law enforcement may need to be able to track particular vehicle for various reasons, i.e., car has been stolen. In such case, the vehicle needs to transmit the vehicle permanent identification information for routing to the authorized law enforcement agency with proper security and privacy protections. However, there is currently no message in any format that has been defined for transmitting permanent vehicle identifier information so that it can be received by the authorized law enforcement agency's server.

To the contrary, most vehicle transmissions, including BSMs which are one of the most important messages transmitted by vehicles, include a temporary identifier due to privacy concerns. BSMs can be decoded by all parties for traffic safety purpose. Including temporary identifiers in transmitted BSMs prevents unauthorized parties from tracking vehicles. However, this also prevents law enforcement from tracking vehicles for legitimate government purposes.

SUMMARY

Various aspects include methods enabling a vehicle, such as an autonomous vehicle, a semi-autonomous vehicle, etc., to communicate vehicle identification information to a concerned party, such as law enforcement, when there is a detected need to report such information.

Various aspects include detecting that there is a need to transmit the vehicle permanent identification information for routing to a concerned party; generating a message including the vehicle permanent identification information in response to detecting the need to transmit the vehicle permanent identification information, and transmitting the generated message to a roadside unit for routing to the concerned party. In some aspects, generating the message may be accomplished by including the vehicle permanent identification information in an extension to a basic safety message. In some aspects, generating the message may be accomplished by generating a new message that is defined to transmit vehicle permanent identification information.

In some aspects, the generated message may be transmitted via a PC5 direct communication link between the vehicle and the roadside unit. via an 802.11p-based Dedicated Short Range Communication (DSRC) link between the vehicle and the roadside unit. In some aspects, the generated message may be transmitted via a utility uplink communication link to a wireless communication network base station for routing to the concerned party.

Some aspects may further include detecting that the vehicle has been stolen, and detecting that there is a need to transmit the vehicle permanent identification information for routing to law enforcement agency in response to detecting that the vehicle has been stolen.

Further aspects include a vehicle including a vehicle computing device having a processor configured with processor-executable instructions to perform operations of any of the methods summarized above. Further aspects include a non-transitory processor-readable storage medium having stored thereon processor-executable software instructions configured to cause a vehicle computing device processor to perform operations of any of the methods summarized above. Further aspects include a computing device for use in a vehicle and configured to perform operations of any of the methods summarized above. Further aspects include a vehicle having means for performing functions of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 6 is an example communication schema for including permanent vehicle identifier information in BSM messages.

FIG. 7 is an example communication schema for providing permanent vehicle identifier information in a new message defined for such purposes.

DETAILED DESCRIPTION

Figure 1A:
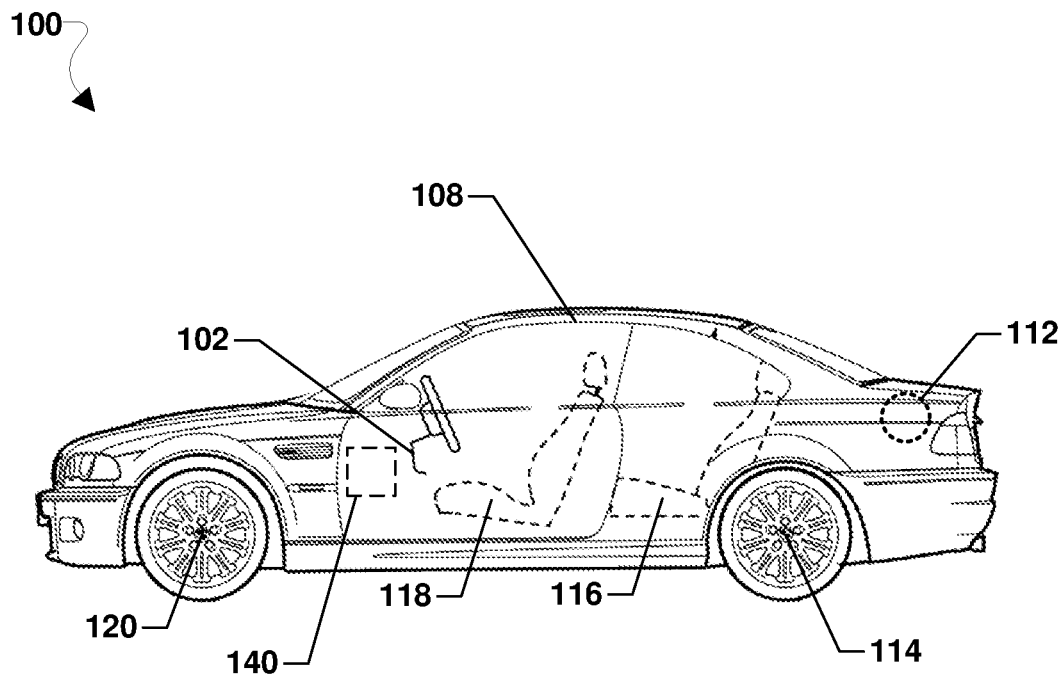
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments provide methods and a communication schema for communicating permanent vehicle identification information to a concerned party, such as law enforcement, in response to detecting that there is a need to provide such information.

C-V2X messages are designed to be decoded by many parties, including other vehicles and road side units which may be under control of different operators. For this reason, the identifier contained in BSMs is a temporary identifier that cannot be used to track the vehicle and also to maintain the privacy of the operator. Thus, vehicle identification information is obscured from the C-V2X transmissions by vehicles interacting with a surface transportation network, including road side units. However, there are a number of circumstances and situations in which an authorized concerned party may need to receive permanent vehicle identification information in order to provide and/or perform legitimate functions (e.g., law enforcement, tax collection, vehicle authorization, etc.) or provide needed services (e.g., fleet management, emergency response, etc.). Since temporary vehicle identifiers included in C-V2X messages are not linked to the vehicle's permanent identifier and change frequently to prevent unauthorized tracking of vehicles, conventional C-V2X messages may not address the need for concerned parties to learn the permanent vehicle identifier information when circumstances present a need to receive such information.

To address this need to transmit permanent vehicle identifier information in C-V2X messages under certain circumstances, various embodiments include operations for detecting when a situation arises in which the permanent vehicle identification information should be communicated to an appropriate concerned party for a legitimate purpose, such as to a law enforcement agency for the purpose of tracking a stolen vehicle. Various embodiments may include detecting that there is a need to transmit the vehicle permanent identification information for routing to a concerned party, generating a message including the vehicle permanent identification information in response to detecting the need to transmit the vehicle permanent identification information, and transmitting the generated message to a roadside unit for routing to the concerned party. By transmitting vehicle permanent identification information in C-V2X only in response to detecting a need to transmit such information, privacy concerns can be avoided while permitting concerned parties to receive the identification information when necessary for a legitimate purpose.

In various embodiments, any of a number of events, detectable conditions or circumstances may trigger or cause the processor to detect that there is a need to transmit the vehicle permanent identification information for routing to a concerned party. In some embodiments, a vehicle security system may signal the processor when that system detects that the vehicle is being broken into or stolen. In some embodiments, the processor may be configured to detect that there is a need to transmit the vehicle permanent identification information for routing to a particular concerned party based on a calendar date, day of month, day of week or time of day, so as to provide a periodic reporting of certain information. For example, a road taxing authority may gather roadway use information from vehicles for use in taxing users on a monthly, quarterly or yearly basis. As another example, auto leasing companies may gather location and/or use information for use in monitoring leased vehicles on a periodic basis. In some embodiments, external conditions detected by a vehicle sensor may cause the processor to detect that there is a need to transmit the vehicle permanent identification information for routing to an authority, such as to report detection of a fire or an accident. In some embodiments, internal conditions of the vehicle may cause the processor to detect that there is a need transmit the vehicle permanent identification information for routing to a first responder authority, such as to report an occupant or pet in locked in the vehicle with internal temperatures exceeding a threshold. In some embodiments, the location of the vehicle may cause the processor to detect that there is a need to transmit the vehicle permanent identification information for routing to an authority. For example, toll road and toll bridge authorities may indicate locations where a toll is due in the form of geographic coordinates or a "geofence" that is downloaded to vehicle processors, and the processor may be configured to detect that there is a need to transmit the vehicle permanent identification information for routing to the associated toll collection authority upon crossing such a geofence. As another example, military installations or other sensitive areas may be defined by geofences downloaded to vehicle processors, and the processor may be configured to detect that there is a need transmit the vehicle permanent identification information for routing to a government authority upon crossing such a geofence.

In various embodiments, the processor may generate a C-V2X message that includes the vehicle's permanent identification information or append the vehicle's permanent identification information to a C-V2X message. Non-limiting examples of vehicle permanent identification information may include the vehicle identification number (VIN), a license plate number, a vehicle registration number, or a serial or other unique number assigned by a vehicle fleet manager. In some embodiments, the vehicle permanent identification information may be included BSM messages, such as in an addendum to such messages. In some embodiments, the vehicle permanent identification information may be included in a new C-V2X message, such as a message formatted specifically for communicating such information. In some embodiments, the generated vehicle C-V2X messages may include an indication of the circumstance or condition that the processor considered or used in detecting the need to transmit permanent vehicle identification information in vehicle C-V2X messages, which may enable a road side unit or a server in the surface transportation network to determine the concerned party to which the information should be routed. In some embodiments, the generated vehicle C-V2X messages may identify how a road side unit or a server in the surface transportation network should route permanent vehicle identification information and other information to the appropriate concerned party, such as an Internet address.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

It is worth noting that transmitting the vehicle permanent identification information in C-V2X messages in an unencrypted format in response to a detecting a specific need to transmit such information may not compromise individual privacy or result in vehicle tracking by unauthorized parties. This is because in some cases the transmissions could be limited to one or a few transmissions of C-V2X messages, such as one or a few BSM messages, only when specific criteria are satisfied. For example, periodic transmissions of vehicle permanent identification information in C-V2X messages, such might be associated with tax collections or vehicle fleet monitoring, could be limited to one or a few BSM or other messages transmitted at the scheduled instant once a month or quarter. As another example, transmission of vehicle permanent identification information in C-V2X messages in response to crossing a geofence would be no more intrusive than other geofence-initiated messaging. Another reason various embodiments may not present a privacy concern is that continuous transmissions of the vehicle permanent identification information could be limited to circumstances in which there is no need to protect a vehicle owner's privacy, such as when the vehicle has been stolen and is being tracked by a law enforcement authority.

However, in some embodiments the vehicle permanent identification information may be encrypted using any known encryption technologies (e.g., public key encryption methods), and the encrypted vehicle permanent identification information may be transmitted in the C-V2X messages.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

Figure 1B:
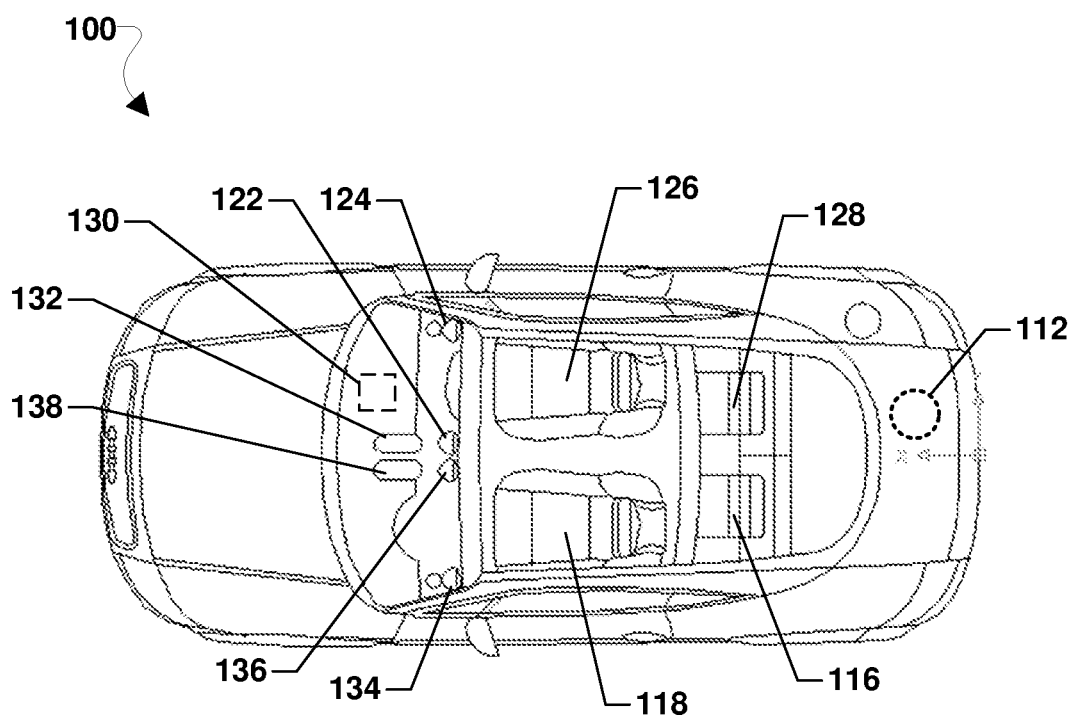

Various embodiments may be implemented within a variety of vehicles, an example vehicle 100 of which is illustrated in FIGS. 1A and 1B. With reference to FIGS. 1A and 1B, a vehicle 100 may include a vehicle computing device 140 and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138.

The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a vehicle computing device 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle computing device 140, which is sometimes referred to as an onboard unit (OBU), may be configured with processor-executable instructions to perform various embodiments using information received from various sensors, particularly the cameras 122, 136. In some embodiments, the vehicle computing device 140 may supplement the processing of camera images using distance and relative position (e.g., relative bearing angle) that may be obtained from radar 132 and/or lidar 138 sensors. The vehicle computing device 140 may further be configured to control steering, breaking and speed of the vehicle 100 when operating in an autonomous or semi-autonomous mode using information regarding other vehicles determined using various embodiments.

Figure 2:
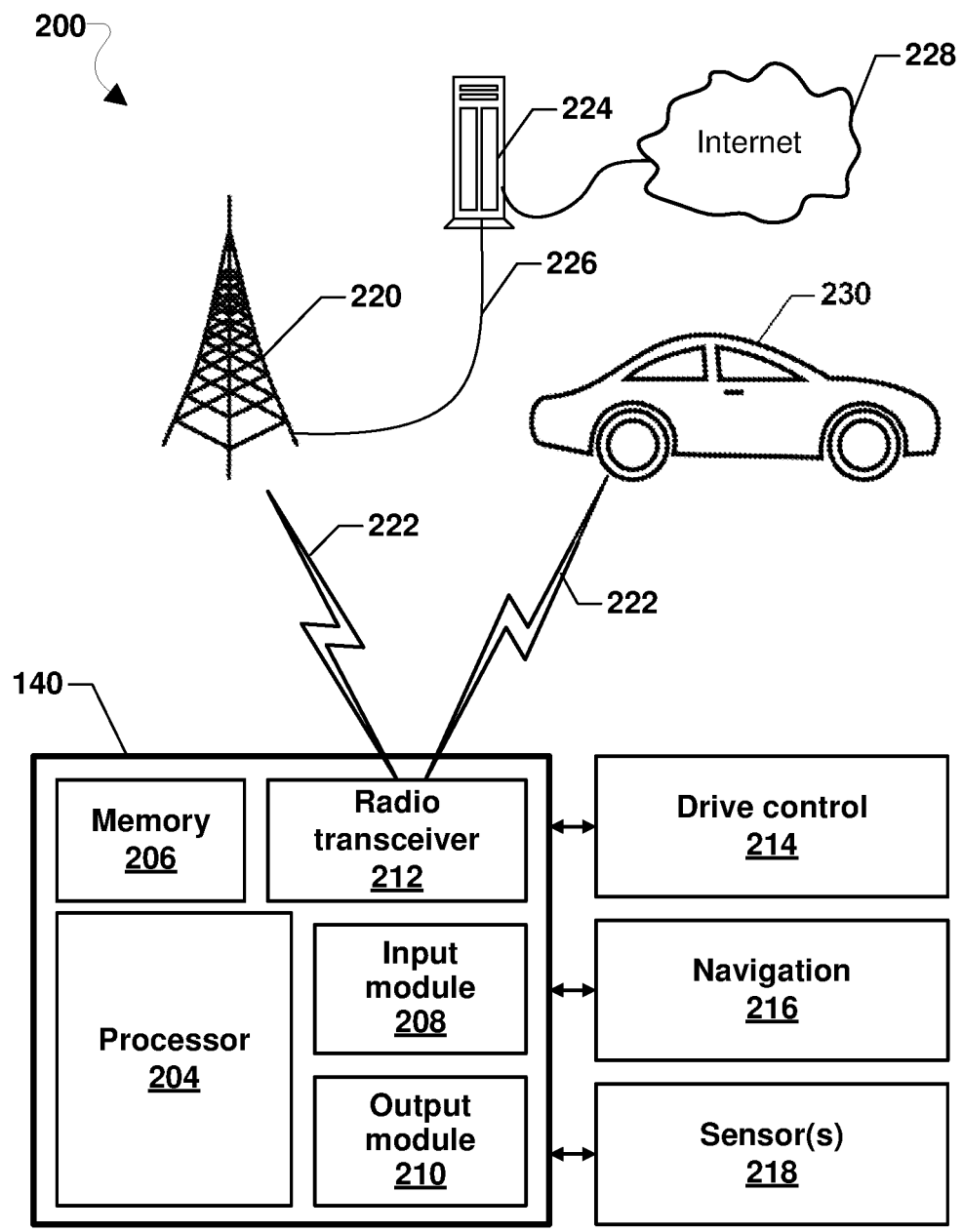
FIG. 2 is a system block diagram illustrating components of a vehicle computing device in communication with road side units and other vehicles suitable for implementing various embodiments.

FIG. 2 is a component block diagram illustrating a system 200 of components and support systems suitable for implementing various embodiments. With reference to FIGS. 1A, 1B, and 2, a surface transportation network 200 may include vehicle computing devices 140 in vehicles 100, 230 that are configured to communicate via wireless communications (e.g., C-V2X protocol messages 222) with other vehicles and road side units 220, and road side units 220 may communicate with network servers 224 (e.g., via wireless or wired communication links 226). Network servers 224 may be coupled to wide area network 228, such as the Internet, and be configured to route permanent vehicle information to concerned parties using any of a variety of known network message transport protocols.

A vehicle computing device 140, which may include various circuits and devices used to control the operation of the vehicle 100 as well as communicate with other devices within a surface transportation network 200.

In the example illustrated in FIG. 2, the vehicle computing device 140 includes a processor 204, memory 206, an input module 208, an output module 210 and a radio transceiver 212. The vehicle computing device 140 may be coupled to and configured to control drive control components 214, navigation components 216, and one or more sensors 218 of the vehicle 100. The processor 204 that may be configured with processor-executable instructions to control maneuvering, navigation, and/or other operations of the vehicle 100, including operations of various embodiments. The processor 204 may be coupled to the memory 206. The vehicle computing device 140 may include the input module 208, the output module 210, and the radio transceiver 212.

The radio transceiver 212 may be configured 212 to transmit and receive C-V2X protocol messages (e.g., BSMs) with road side units 220 and other vehicles 230.

The input module 208 may receive sensor data from one or more vehicle sensors 218 as well as electronic signals from other components, including the drive control components 214 and the navigation components 216. The output module 210 may be used to communicate with or activate various components of the vehicle 100, including the drive control components 214, the navigation components 216, and the sensor(s) 218.

The vehicle computing device 140 may be coupled to the drive control components 214 to control physical elements of the vehicle 100 related to maneuvering and navigation of the vehicle, such as the engine, motors, throttles, steering elements, flight control elements, braking or deceleration elements, and the like. The drive control components 214 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The vehicle computing device 140 may be coupled to the navigation components 216, and may receive data from the navigation components 216 and be configured to use such data to determine the present position and orientation of the vehicle 100, as well as an appropriate course toward a destination. In various embodiments, the navigation components 216 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 216 may include radio navigation receivers for receiving navigation beacons or other signals from radio nodes, such as Wi-Fi access points, cellular network sites, radio station, remote computing devices, other vehicles, etc. Through control of the drive control elements 214, the processor 204 may control the vehicle 100 to navigate and maneuver. The processor 204 and/or the navigation components 216 may be configured to communicate with a road side unit 230 to receive commands to control maneuvering, receive data useful in navigation, provide real-time position reports, and assess other data.

The vehicle computing device 140 may be coupled to one or more sensors 218. The sensor(s) 218 may include the sensors 102-138 as described, and may the configured to provide a variety of data to the processor 204.

The processor 204 of the vehicle computing device 140 may be configured to receive information regarding the vehicle's position and direction of travel (e.g., from navigation components 216), speed (e.g., from drive control components 214), and other information (e.g., from sensor(s) 218) and generate C-V2X messages, such as BSMs, for transmission by the radio transceiver 212. For example, BSMs inform other vehicles 230 as well as the surface transportation network 200 via road side units 220 of the vehicle's status, position, direction of travel and speed so that other vehicles, such as autonomous vehicles, can avoid collisions. BSMs also inform the surface transportation network 200 of the locations and speeds of vehicles on the roadway, enabling the system to identify safety concerns, traffic jams, etc. BSMs may be transmitted frequently so that other vehicles 230 and road side units 220 are kept informed about the vehicles position and state.

The processor 204 of the vehicle computing device 140 may be configured to receive BSMs from other vehicles 230 and use such information in controlling vehicle operations (e.g., providing other vehicle positions to drive control components 214 and/or navigation components 216). The processor 204 may also be configured to receive and process other C-V2X messages from road side units 220, such as RSI, MAP, SPaT, and RSM messages, and use the information in such messages and use such information in controlling vehicle operations, notifying the operator of safety conditions, etc.

In various embodiments, the processor 204 may include permanent vehicle identification information in C-V2X messages that will be received by road side units 220, such as BSMs. The road side units 220 may be configured to forward C-V2X messages including permanent vehicle identification information, as well as other information, to a server 224 of the surface transportation network 220. The server 224 may be configured to forward permanent vehicle identification information, as well as other information, obtained from vehicle C-V2X messages, to an appropriate concerned party, such as law enforcement. In some embodiments, the vehicle C-V2X messages may include an indication of the circumstance or condition triggering the need to transmit permanent vehicle identification information in vehicle C-V2X messages, which information the server 224 to determine the appropriate concerned party to which the permanent vehicle identification information and other vehicle information should be routed. In some embodiments, the vehicle C-V2X messages may identify how permanent vehicle identification information and other information in vehicle C-V2X messages should be routed to the appropriate concerned party, such as an Internet address.

While the vehicle computing device 140 is described as including separate components, in some embodiments some or all of the components (e.g., the processor 204, the memory 206, the input module 208, the output module 210, and the radio transceiver 212) may be integrated in a single device or module, such as a system-on-chip (SOC) processing device. Such an SOC processing device may be configured for use in vehicles and be configured, such as with processor-executable instructions executing in the processor 204, to perform operations of various embodiments when installed into a vehicle.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

Figure 3:
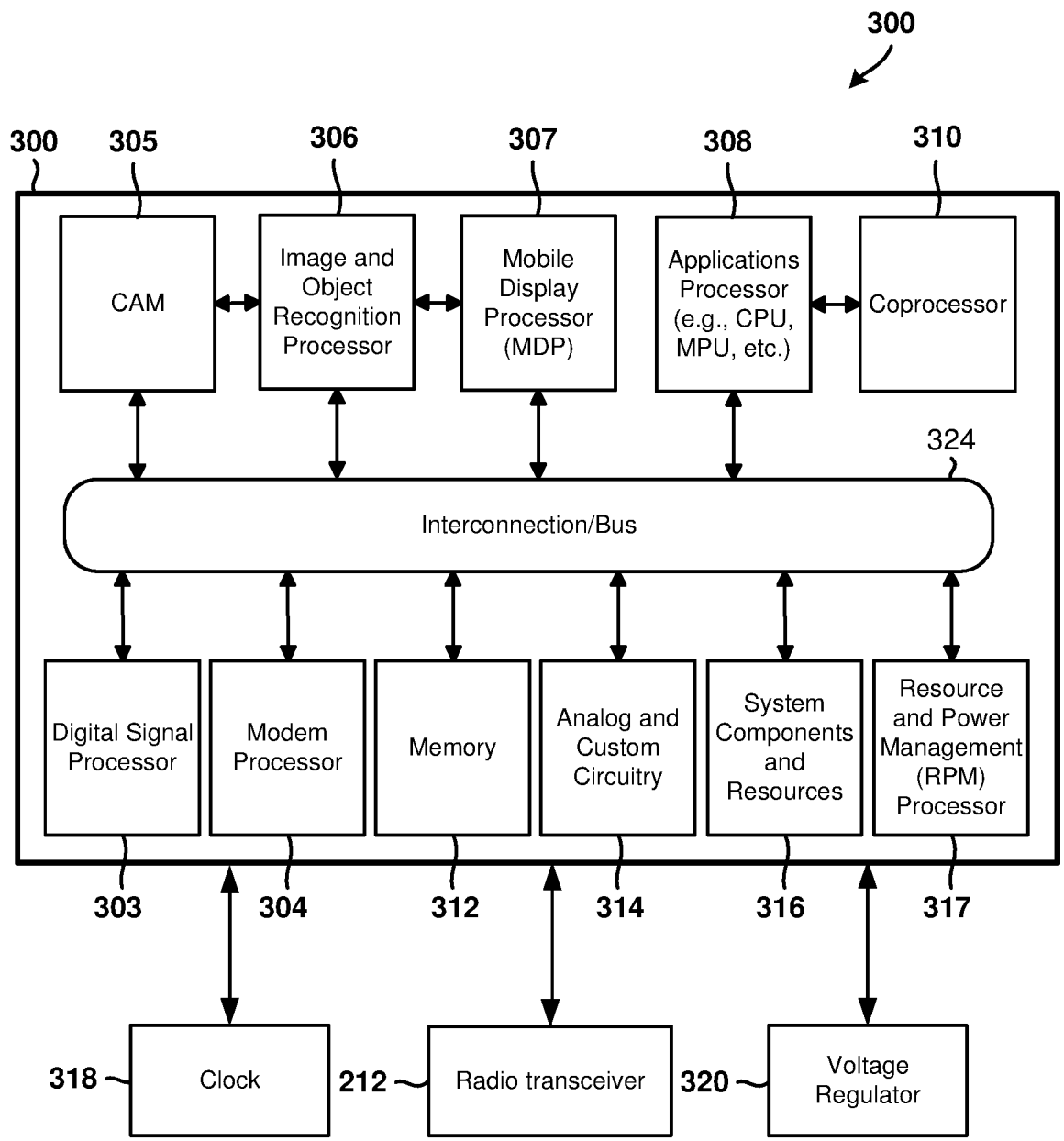
FIG. 3 is a block diagram illustrating components of an example system on chip for use in a vehicle that may be configured to broadcast vehicle C-V2X messages in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more vehicle cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 204 as described. In some embodiments, the processor 306 may be configured to process radar or lidar data.

The system components and resources 316, analog and custom circuitry 314, and/or CAM 305 may include circuitry to interface with peripheral devices, such as cameras radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a radio transceiver 212, a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a vehicle computing device (e.g., 140) for use in a vehicle (e.g., 100). The vehicle computing device may include communication links for communication with a telephone network (e.g., 220), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
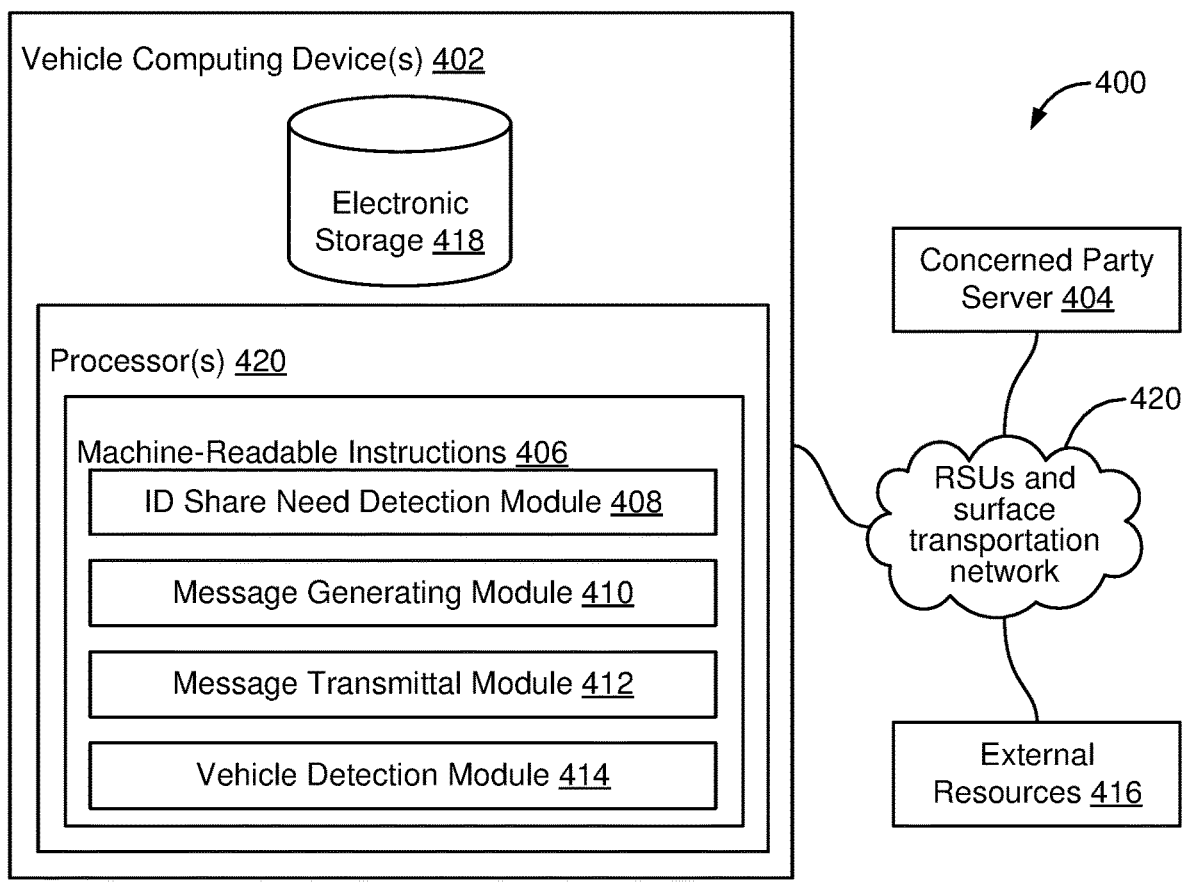
FIG. 4 shows a component block diagram of an example system configured for vehicles to communicate vehicle identification information to a concerned party, such as law enforcement, when there is a detected need to report such information.

FIG. 4 shows a component block diagram illustrating a system 400 configured for communicating permanent vehicle identification information in response to detecting a need for such communications in accordance with various embodiments. In some embodiments, the system 400 may include one or more vehicle computing device(s) 402 configured to communicate via road side units and/or a surface transportation network with one or more concerned party servers 404. With reference to FIGS. 1A-4, the vehicle computing device(s) 402 may include a processor (e.g., 204), a processing device (e.g., 300), and/or a vehicle computing device (e.g., 140) (variously referred to as a "processor") of a vehicle (e.g., 100).

The vehicle computing device(s) 402 may be configured by machine-executable instructions 406. Machine-executable instructions 406 may include one or more instruction modules. The instruction modules may include computer program modules. The instruction modules may include one or more of a need to share vehicle ID detection module 408, message generating module 410, message transmittal module 412, vehicle detection module 414, and/or other instruction modules.

Need to share vehicle ID detection module 408 may be configured to detect that there is a need to transmit the vehicle permanent identification information for routing to a concerned party.

Need to share vehicle ID detection module 408 may be configured to detect that there is a need to transmit the vehicle permanent identification information for routing to law enforcement agency in response to detecting that the vehicle has been stolen.

Message generating module 410 may be configured to generate a message including the vehicle permanent identification information.

Message generating module 410 may be configured to generate the message by including the vehicle permanent identification information in and extension to a basic safety message.

Message generating module 410 may be configured to generate the message by generating a new message that is defined to transmit vehicle permanent identification information.

Message transmittal module 412 may be configured to transmit the generated message to a roadside unit for routing to the concerned party.

Message transmittal module 412 may be configured to transmit the generated message via a PC5 direct communication link between the vehicle and the roadside unit.

Message transmittal module 412 may be configured to transmit the generated message via an 802.11p-based DSRC link between the vehicle and the roadside unit.

Message transmittal module 412 may be configured to transmit the generated message via a utility uplink communication link to a wireless communication network base station for routing to the concerned party.

Vehicle detection module 414 may be configured to detect that the vehicle has been stolen.

In some implementations, vehicle computing device(s) 402, concerned party server(s) 404 (e.g., a law enforcement server), and/or external resources 416 may be operatively linked via one or more electronic communication links of road side units and/or a surface transportation network 420. For example, such electronic communication links may be established, at least in part, via a network such as the Internet and/or other networks. It will be appreciated that this is not intended to be limiting, and that the scope of this disclosure includes implementations in which vehicle computing device(s) 402, concerned party server(s) 404 (e.g., a law enforcement server), and/or external resources 416 may be operatively linked via some other communication media.

External resources 416 may include sources of information outside of system 400, external entities participating with system 400, and/or other resources. In some implementations, some or all of the functionality attributed herein to external resources 416 may be provided by resources included in system 400.

Vehicle computing device(s) 402 may include electronic storage 418, one or more processors 420, and/or other components. Vehicle computing device(s) 402 may include communication lines, or ports to enable the exchange of information with a network and/or other computing platforms. Illustration of vehicle computing device(s) 402 in FIG. 4 is not intended to be limiting. Vehicle computing device(s) 402 may include a plurality of hardware, software, and/or firmware components operating together to provide the functionality attributed herein to vehicle computing device(s) 402.

Electronic storage 418 may comprise non-transitory storage media that electronically stores information. The electronic storage media of electronic storage 418 may include one or both of system storage that is provided integrally (i.e., substantially non-removable) with vehicle computing device(s) 402 and/or removable storage that is removably connectable to vehicle computing device(s) 402 via, for example, a port (e.g., a universal serial bus (USB) port, a firewire port, etc.) or a drive (e.g., a disk drive, etc.). Electronic storage 418 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 418 may include one or more virtual storage resources (e.g., cloud storage, a virtual private network, and/or other virtual storage resources). Electronic storage 418 may store software algorithms, information determined by processor(s) 420, information received from vehicle computing device(s) 402, information received from concerned party server(s) 404 (e.g., a law enforcement server), and/or other information that enables vehicle computing device(s) 402 to function as described herein.

The processor(s) 420 may be configured to provide information processing capabilities in the vehicle computing device(s) 402. As such, processor(s) 420 may include one or more of a digital processor, an analog processor, a digital circuit designed to process information, an analog circuit designed to process information, a state machine, and/or other mechanisms for electronically processing information. Although the processor(s) 420 is shown in FIG. 4 as a single entity, this is for illustrative purposes only. In some implementations, processor(s) 420 may include a plurality of processing units. These processing units may be physically located within the same device, or processor(s) 420 may represent processing functionality of a plurality of devices operating in coordination. The processor(s) 420 may be configured to execute modules 408, 410, 412, and/or 414, and/or other modules. The processor(s) 420 may be configured to execute modules 408, 410, 412, and/or 414, and/or other modules by software; hardware; firmware; some combination of software, hardware, and/or firmware; and/or other mechanisms for configuring processing capabilities on processor(s) 420. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, and/or 414 are illustrated in FIG. 4 as being implemented within a single processing unit, in implementations in which processor(s) 420 includes multiple processing units, one or more of modules 408, 410, 412, and/or 414 may be implemented remotely from the other modules. The description of the functionality provided by the different modules 408, 410, 412, and/or 414 described below is for illustrative purposes, and is not intended to be limiting, as any of modules 408, 410, 412, and/or 414 may provide more or less functionality than is described. For example, one or more of modules 408, 410, 412, and/or 414 may be eliminated, and some or all of its functionality may be provided by other ones of modules 408, 410, 412, and/or 414. As another example, the processor(s) 420 may be configured to execute one or more additional modules that may perform some or all of the functionality attributed below to one of modules 408, 410, 412, and/or 414.

Figure 5A:
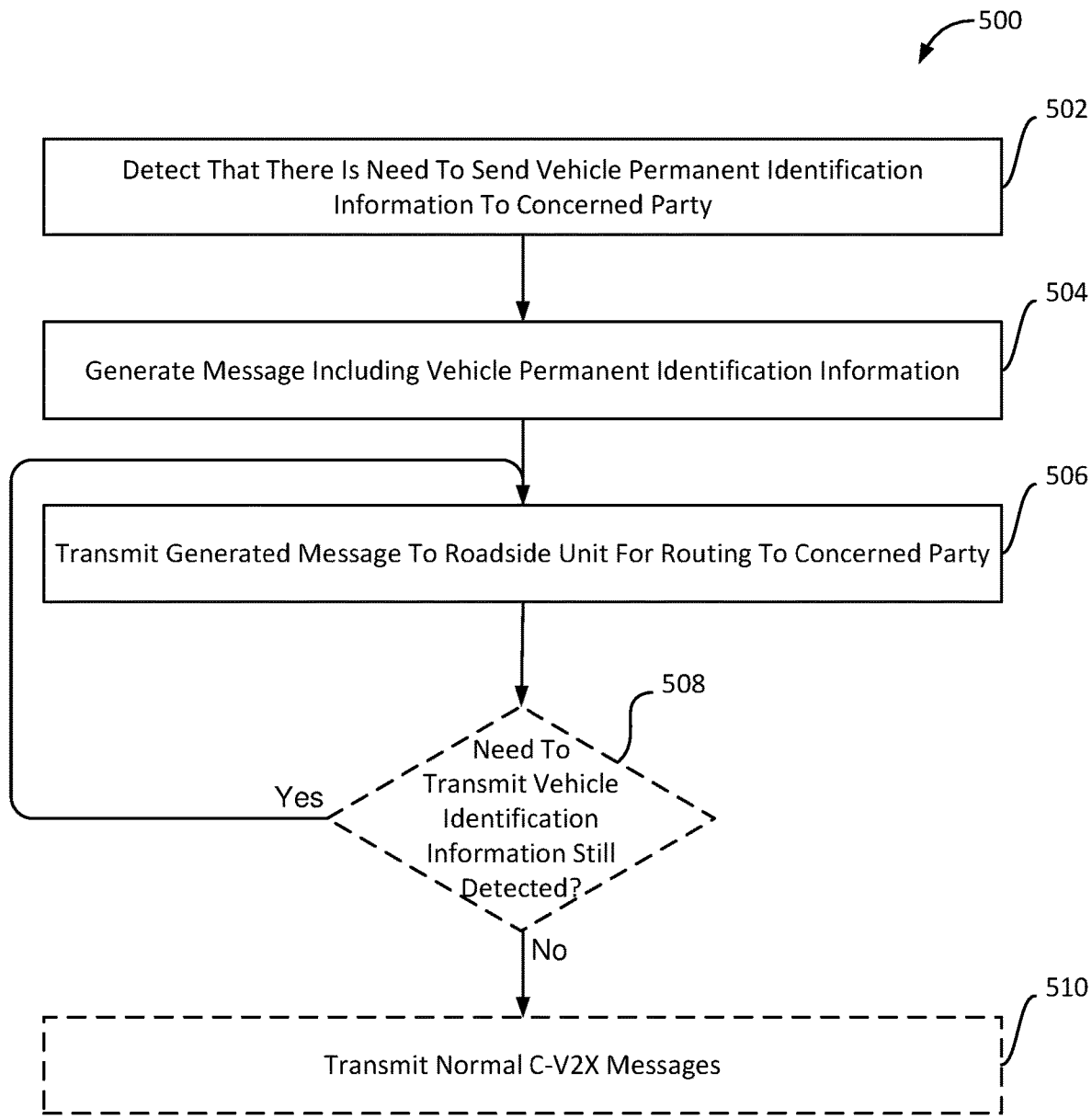
FIGS. 5A, 5B, 5C, 5D, 5E, 5F, and/or 5G show process flow diagrams of example methods for enabling vehicles to communicate vehicle identification information to a concerned party, such as law enforcement, when there is a detected need to report such information according to various embodiments.

FIG. 5A illustrates operations of a method 500 for communicating permanent vehicle identification information via C-V2X communications to a concerned party, such as law enforcement, in response to detecting that there is a need to report such information in accordance with various embodiments. FIGS. 5B, 5C, 5D, 5E, 5F, and 5G illustrate alternative or further details of operations in the method 500 according to some embodiments. With reference to FIGS. 1A-5A, 5B, 5C, 5D, 5E, 5F, and/or 5G, the method 500 may be implemented in a processor (e.g., 204), a processing device (e.g., 300), and/or a vehicle computing device (e.g., 140) (variously referred to as a "processor") of a vehicle (e.g., 100).

FIG. 5A illustrates the method 500 that may be performed by a processor of a vehicle computing device in accordance with various embodiments.

In block 502, the processor may perform operations including detecting that there is a need to transmit the vehicle permanent identification information for routing to a concerned party. In various embodiments, the processor to detect that there is a need to transmit the vehicle permanent identification information for routing to a concerned party in response to determining or detecting any of a number of events, detectable conditions or circumstances. In some embodiments, a vehicle security system may signal the processor when that system detects that the vehicle is being broken into or stolen. In some embodiments, the processor may detect that there is a need to transmit the vehicle permanent identification information for routing to a particular concerned party based on a calendar date, day of month, day of week or time of day, so as to provide a periodic reporting of certain information. In some embodiments, external conditions detected by a vehicle sensor may cause the processor to detect that there is a need to transmit the vehicle permanent identification information for routing to an authority. In some embodiments, internal conditions of the vehicle may cause the processor to detect that there is a need transmit the vehicle permanent identification information for routing to a first responder authority. In some embodiments, the location of the vehicle may cause the processor to detect that there is a need to transmit the vehicle permanent identification information for routing to an authority.

In block 504, the processor may perform operations including generating a message including vehicle permanent identification information. Non-limiting examples of vehicle permanent identification information may include the vehicle identification number (VIN), a license plate number, a vehicle registration number, or a serial or other unique number assigned by a vehicle fleet manager.

In some embodiments, in addition to including the vehicle permanent identification information, the processor may include additional information generated message that may be useful to or needed by the concerned party. In some embodiments, such additional information may depend upon the particular concerned party that is to receive the information. For example, a law enforcement agency may need information to enable tracking a vehicle, while another government agency may different information (e.g., the model, size, weight, or other descriptive detail of the vehicle). In some embodiments, such additional information may depend upon the event or circumstance that lead to the detected need to transmit the information in block 502 when there may be different reasons or needs for transmitting the vehicle permanent identification information for routing to a concerned party. For example, if the processor detects a need to transmit the vehicle permanent identification information based on recognizing that the vehicle is being or has been stolen, the processor may be configured to include additional information that will enable tracking the vehicle by law enforcement authorities, such as position or location, heading, speed and a time stamp for each reporting message. As another example, if the processor detects a need to transmit the vehicle permanent identification information to a taxing authority for calculating a use-based road tax, the processor may be configured to include additional information that will support that calculation, such as the distance driven over a proceeding time period (e.g., month or year). As a further example, if the processor detects a need to transmit the vehicle permanent identification information based on a message received from the concerned party, the processor may be configured to include additional information responsive to data requests included in the received message.

In some embodiments, in block 504 the processor may include in the generated message an indication of the circumstance or condition that the processor considered or used in detecting the need to transmit permanent vehicle identification information in vehicle C-V2X messages, which may enable a road side unit or a server in the surface transportation network to determine the concerned party to which the information should be routed. In some embodiments, in block 504 the processor may include in the generated message an information specifying how a road side unit or a server in the surface transportation network should route permanent vehicle identification information and other information to the appropriate concerned party, such as an Internet address or Uniform Resource Locator (URL).

As noted herein, unencrypted vehicle permanent identification information may be included in C-V2X messages (e.g. BSM) without raising privacy concerns provided this information is only included in such messages in response to and only for the duration of detecting a specific need or reason for such transmissions. However, in some embodiments the processor may encrypt the vehicle permanent identification information, and other sensitive information, as part of the operations generating the message in block 504.

In block 506, the processor may perform operations including transmitting the generated message to a roadside unit for routing to the concerned party. Such transmissions may use C-V2X communication technologies, such as in BSM or similar messages, but other communication and messaging protocols may be used by the processor.

In optional determination block 508 the processor may determine whether the need to transmit the vehicle permanent identification information, as well as other information, continues to be detected. For example, the processor may consider the circumstance, sensor or condition that caused the processor to detect the need to transmit such information to determine the circumstance, sensor or condition continue or are still present. This determination may be optional because in some implements or circumstances messages including vehicle permanent identification information should continue to be transmitted once the need is detected.

In response to determining that the need to transmit the vehicle permanent identification information, as well as other information, continues to be detected (i.e., optional determination block 508="Yes"), the processor may continue to transmit the generated message in block 506.

In response to determining that the need to transmit the vehicle permanent identification information, as well as other information, is no longer detected (i.e., optional determination block 508="No"), the processor may stop transmitting the generated message and begin transmitting normal C-V2X messages in block 510. For example, the messages transmitted in block 510 may not include any sensitive information, such as the permanent vehicle identification information.

Figure 5B:
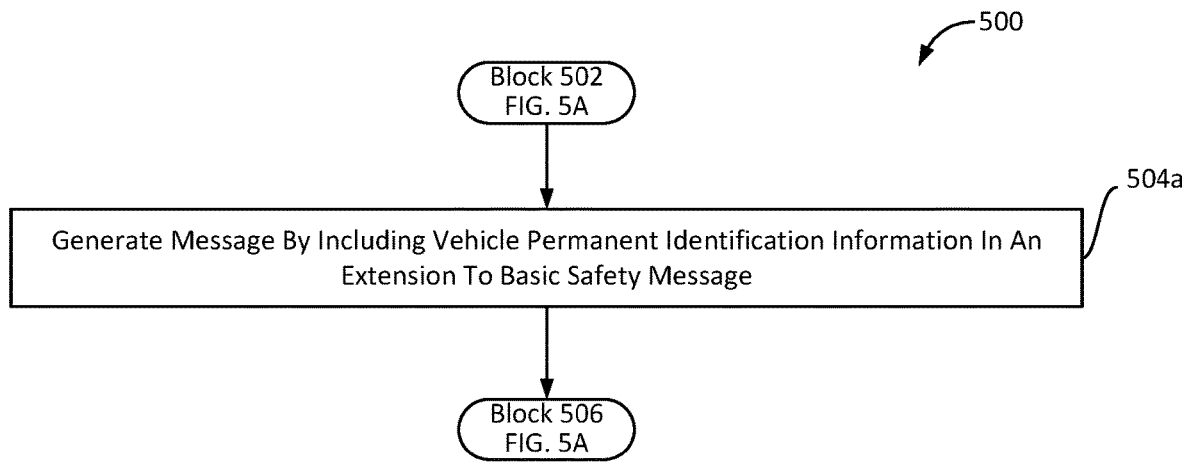

FIG. 5B illustrates an example alternative operation of generating the C-V2X message in the method 500 in accordance with some embodiment. In block 504*a*, the processor may generate the message by including the vehicle permanent identification information, as well as other information, in an extension to a basic safety message (BSM). In some embodiments the processor may include the vehicle permanent identification information, as well as other information, in an addendum to the BSM message. An example of a message schema for including such information in a BSM message is illustrated in FIG. 6. The processor may then transmit the generated message in block 506 as described.

Figure 5C:
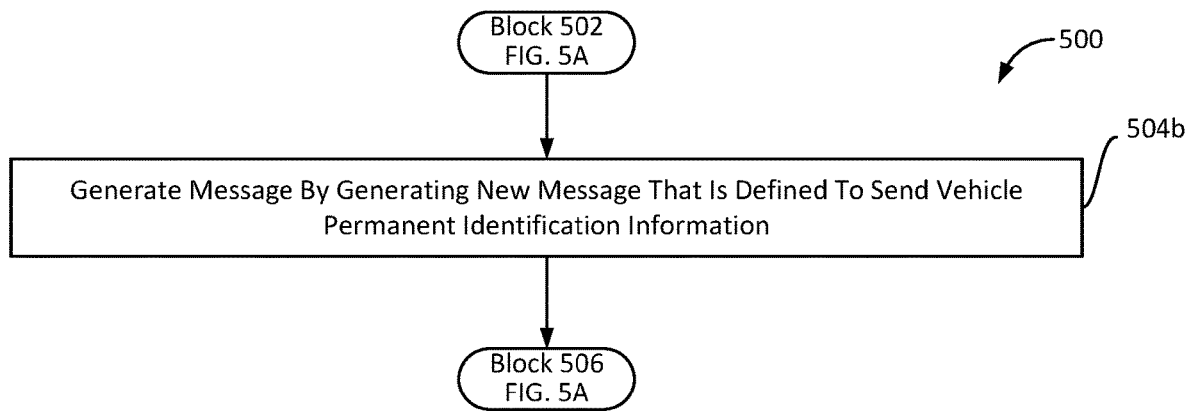

FIG. 5C illustrates an example alternative operation of generating the message in the method 500 in accordance with some embodiment. In block 504*b*, the processor may perform operations including generating the message by generating a message according to a new format that is defined to send vehicle permanent identification information. In addition to the permanent vehicle identifier, the new message may also include information that a concerned party (e.g., law enforcement) will need to receive from the vehicle. For example, for the case of law enforcement tracking a stolen vehicle, the generated messages may need to include information that will facilitate vehicle tracking, such as a time stamp, position or coordinate information, heading or direction, and speed. The message may also include further optional information that may be useful to the concerned party, such as a confidence value or score for the time stamp, a confidence value or score for the position information, a transmission state, a steering angle, a confidence value or score for the motion information, braking system state, vehicle size, vehicle classification, vehicle safety equipment, etc. The processor may then transmit the generated message in block 506 as described.

Figure 5D:
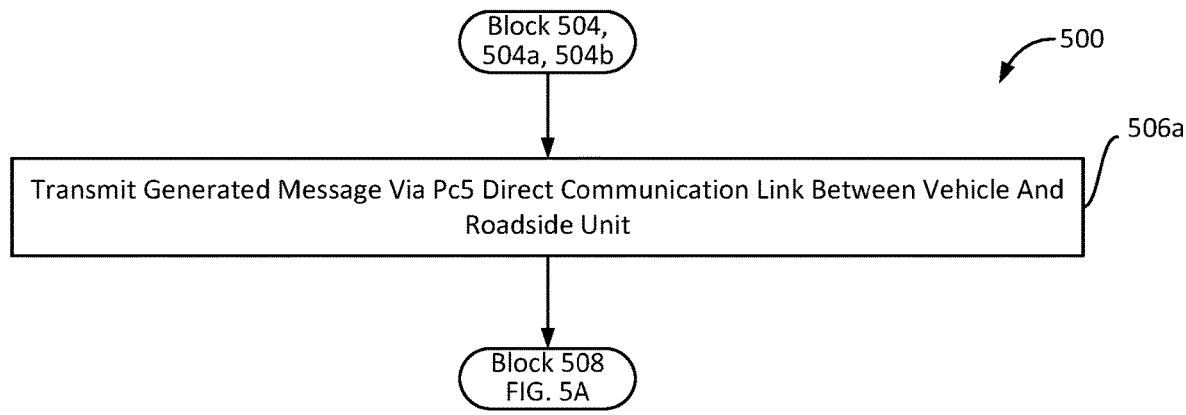

FIG. 5D illustrates an example alternative operation of transmitting the message in the method 500 in accordance with some embodiment. Following the operations in any blocks 504, 504*a* or 504*b*, the processor may perform operations in block 506*a* including transmitting the generated message via a PC5 direct communication link between the vehicle and the roadside unit. The processor may then perform the operations of optional determination block 508 as described.

Figure 5E:
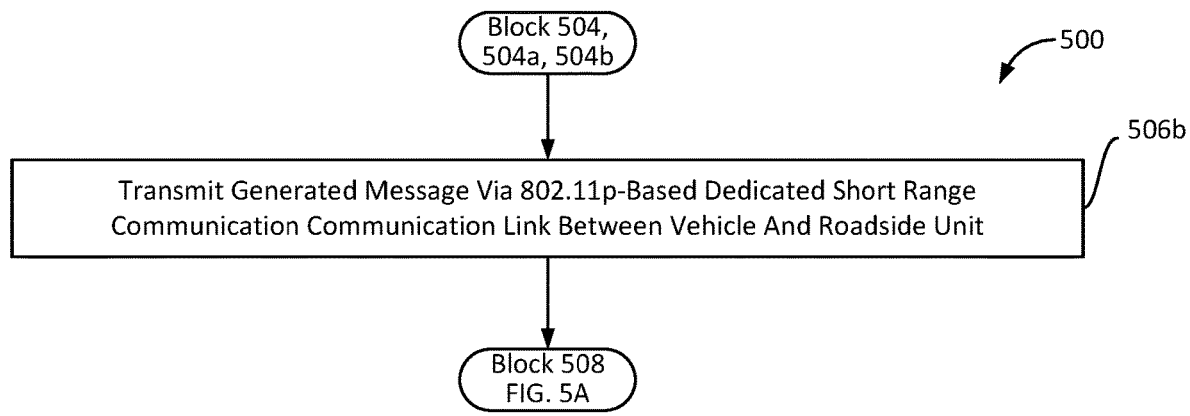

FIG. 5E illustrates an example alternative operation of transmitting the message in the method 500 in accordance with some embodiment. Following the operations in any blocks 504, 504*a* or 504*b*, the processor may perform operations in block 506*b* including transmitting the generated message via an 802.11p-based DSRC link between the vehicle and the roadside unit. The processor may then perform the operations of optional determination block 508 as described.

Figure 5F:
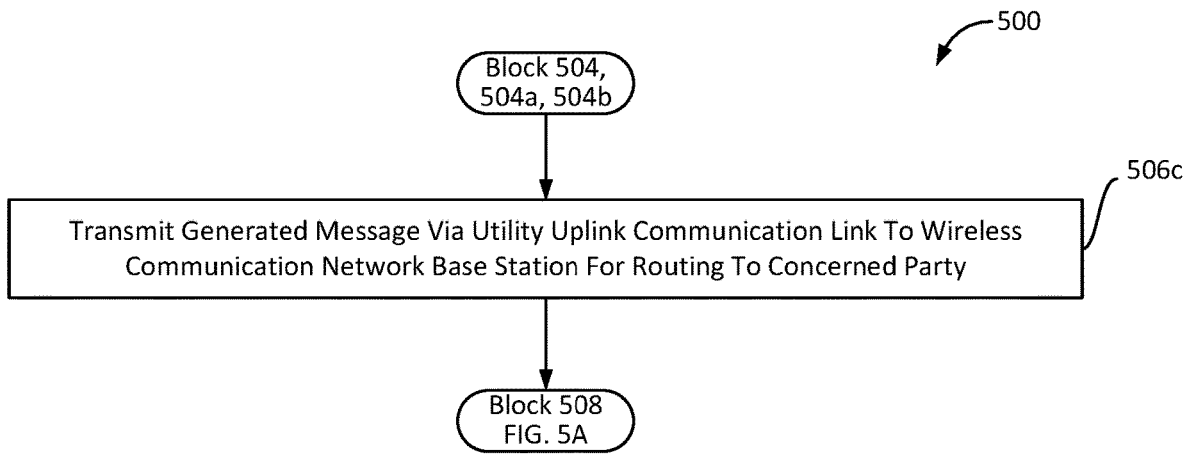

FIG. 5F illustrates an example alternative operation for transmitting the message in the method 500 in accordance with some embodiments. Following the operations in any blocks 504, 504*a* or 504*b*, the processor may perform operations in block 506*c* including further including transmitting the generated message via a utility uplink (e.g., the Uu link) communication link to a wireless communication network base station for routing to the concerned party. The processor may then perform the operations of optional determination block 508 as described.

Figure 5G:
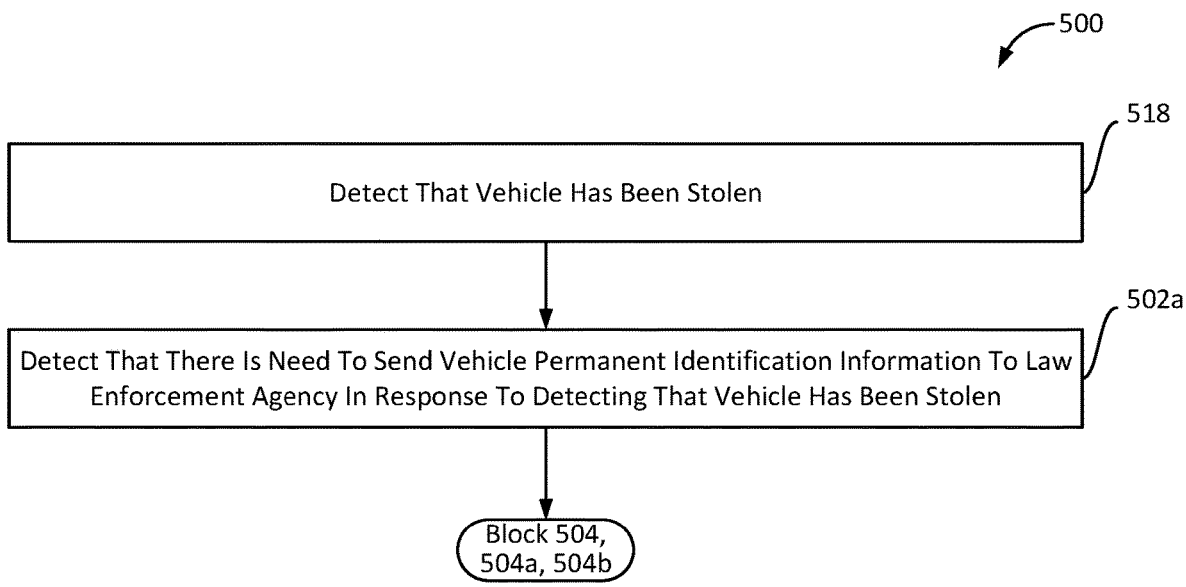

FIG. 5G illustrates an example of operations that may be performed in the method 500 for detecting the need to send the vehicle permanent identification information.

In block 518, the processor may perform operations including detecting that the vehicle has been stolen. For example, a vehicle alarm or security system may include sensors and logic configured to detect break ins and unauthorized operation of the vehicle, and send a message to the processor upon determining that the vehicle is being or has been stolen.

In block 502*a*, the processor may perform operations including detecting that there is a need to send the vehicle permanent identification information to law enforcement agency in response to detecting that the vehicle has been stolen. The processor may then generate a message including the vehicle permanent identification information, as well as other information, in any of blocks 504, 504*a* or 504*b* as described.

FIG. 6 is an example communication schema for including permanent vehicle identifier information in BSM messages. As illustrated in FIG. 6, the vehicle permanent identification information, as well as other information, may be included in a BSM as an addendum to the standard BSM information.

FIG. 7 is an example communication schema for providing permanent vehicle identifier information in a new message defined for such purposes. As illustrated in FIG. 7, a new format message may include the vehicle permanent identification information along with other information about the vehicle that may be useful to a concerned party, such as a law enforcement agency attempting to track a stolen vehicle.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method performed by a computing device of a vehicle for communicating vehicle identification information to a concerned party, comprising:
    detecting that there is a need to send vehicle permanent identification information to a concerned party based on:
        a detection of a person or animal in the vehicle when a vehicle internal temperature meets a temperature threshold;
    generating a message including the vehicle permanent identification information; and
    transmitting the generated message to a roadside unit for routing to the concerned party.

2. The method of claim 1, wherein generating a message including the vehicle permanent identification information comprises including the vehicle permanent identification information in an extension to a basic safety message (BSM).

3. The method of claim 1, wherein generating a message including the vehicle permanent identification information comprises generating a new message that is defined to send vehicle permanent identification information.

4. The method of claim 1, wherein transmitting the generated message to a roadside unit for routing to the concerned party comprises transmitting the generated message via a PC5 direct communication link between the vehicle and the roadside unit.

5. The method of claim 1, wherein transmitting the generated message to a roadside unit for routing to the concerned party transmitting the generated message via an 802.11p-based Dedicated Short Range Communication (DSRC) communication link between the vehicle and the roadside unit.

6. The method of claim 1, wherein transmitting the generated message to a roadside unit for routing to the concerned party transmitting the generated message via a utility uplink (Uu) communication link to a wireless communication network base station for routing to the concerned party.

7. A vehicle, comprising:
    a transceiver; and
    a computing device configured with processor-executable instructions to:
        detect that there is a need to send vehicle permanent identification information to a concerned party based on:
            a detection of a person or animal in the vehicle when a vehicle internal temperature meets a temperature threshold;
        generate a message including the vehicle permanent identification information; and
        transmit the generated message to a roadside unit for routing to the concerned party.

8. The vehicle of claim 7, wherein the computing device is further configured with processor-executable instructions to generate the message by including the vehicle permanent identification information in an extension to a basic safety message (BSM).

9. The vehicle of claim 7, wherein the computing device is further configured with processor-executable instructions to generate the message by generating a new message that is defined to send vehicle permanent identification information.

10. The vehicle of claim 7, wherein the computing device is further configured with processor-executable instructions to transmit the generated message via a PC5 direct communication link between the vehicle and the roadside unit.

11. The vehicle of claim 7, wherein the computing device is further configured with processor-executable instructions to transmit the generated message via an 802.11p-based Dedicated Short Range Communication (DSRC) communication link between the vehicle and the roadside unit.

12. The vehicle of claim 7, wherein the computing device is further configured with processor-executable instructions to transmit the generated message via a utility uplink (Uu) communication link to a wireless communication network base station for routing to the concerned party.

13. A computing device configured for use in a vehicle, comprising:
 a processor configured with processor-executable instructions to:
  detect that there is a need to send vehicle permanent identification information to a concerned party based on:
   a detection of a person or animal in the vehicle when a vehicle internal temperature meets a temperature threshold;
  generate a message including the vehicle permanent identification information; and
  transmit the generated message to a roadside unit for routing to the concerned party.

14. The computing device of claim 13, wherein the processor is further configured with processor-executable instructions to:
 generate the message by including the vehicle permanent identification information in an extension to a basic safety message (BSM).

15. The computing device of claim 13, wherein the processor is further configured with processor-executable instructions to:
 generate the message by generating a new message that is defined to send vehicle permanent identification information.

16. The computing device of claim 13, wherein the processor is further configured with processor-executable instructions to transmit the generated message via a PC5 direct communication link between the vehicle and the roadside unit.

17. The computing device of claim 13, wherein the processor is further configured with processor-executable instructions to transmit the generated message via an 802.11p-based Dedicated Short Range Communication (DSRC) communication link between the vehicle and the roadside unit.

18. The computing device of claim 13, wherein the processor is further configured with processor-executable instructions to transmit the generated message via a utility uplink (Uu) communication link to a wireless communication network base station for routing to the concerned party.

19. A vehicle, comprising:
 means for detecting that there is a need to send vehicle permanent identification information to a concerned party based on one of:
  a detection of a person or animal in the vehicle when a vehicle internal temperature meets a temperature threshold;
 means for generating a message including the vehicle permanent identification information; and
 means for transmitting the generated message to a roadside unit for routing to the concerned party.

20. The vehicle of claim 19, wherein means for generating a message including the vehicle permanent identification information comprises means for generating the message by including the vehicle permanent identification information in an extension to a basic safety message (BSM).

21. The vehicle of claim 19, wherein means for generating a message including the vehicle permanent identification information comprises means for generating the message by generating a new message that is defined to send vehicle permanent identification information.

22. The vehicle of claim 19, wherein means for means for transmitting the generated message to a roadside unit for routing to the concerned party comprises means for transmitting the generated message via a PC5 direct communication link between the vehicle and the roadside unit.

23. The vehicle of claim 19, wherein means for means for transmitting the generated message to a roadside unit for routing to the concerned party comprises means for transmitting the generated message via an 802.11p-based Dedicated Short Range Communication (DSRC) communication link between the vehicle and the roadside unit.

24. The vehicle of claim 19, wherein means for means for transmitting the generated message to a roadside unit for routing to the concerned party comprises means for transmitting the generated message via a utility uplink (Uu) communication link to a wireless communication network base station for routing to the concerned party.

\* \* \* \* \*